United States Patent [19]
Mangez

[11] Patent Number: 5,648,713
[45] Date of Patent: Jul. 15, 1997

[54] MODULAR REGULATOR CIRCUIT, FOR A MODULAR ELECTRICAL STORAGE CELL BATTERY, HAVING A NUMBER OF MODULES DEPENDENT ON THE NUMBER OF MODULES OF THE BATTERY

[75] Inventor: Jean Claude Mangez, La Rochelle, France

[73] Assignee: SAFT, Romainville, France

[21] Appl. No.: 456,303

[22] Filed: Jun. 1, 1995

[30] Foreign Application Priority Data

Jul. 4, 1994 [FR] France ................... 94 08211

[51] Int. Cl.[6] ................................................ H01M 10/46
[52] U.S. Cl. ................................. 320/6; 320/14; 320/15
[58] Field of Search ............................. 320/2, 6, 7, 15, 320/17, 18, 30, 14

[56] References Cited

U.S. PATENT DOCUMENTS

| | | | |
|---|---|---|---|
| 3,980,940 | 9/1976 | Mabuchi et al. | 320/2 |
| 4,502,001 | 2/1985 | Galloway | 320/6 |
| 5,504,415 | 4/1996 | Podrazhansky et al. | 320/18 |

FOREIGN PATENT DOCUMENTS

| | | |
|---|---|---|
| 959743 | 3/1957 | Germany . |
| 3438783C1 | 12/1985 | Germany . |
| WO9310589 | 5/1993 | WIPO . |

OTHER PUBLICATIONS

Conference Proceedings of Intelec 86, 19 Oct. 1986, Toronto, Canada, pp. 355–360, D. Bjoerk, "Maintenance of Batteries", 1986.

Primary Examiner—Edward Tso
Attorney, Agent, or Firm—Sughrue, Mion, Zinn, Macpeak & Seas

[57] ABSTRACT

A regulator circuit for a battery of electrical storage cells, and in particular a battery whose voltage is a function of state of charge and which is constituted by "n" identical modules connected in series. The circuit comprises "n−1" regulation modules each associated with two series-connected modules of the battery, each regulation module includes means for bringing the voltage across the terminals of each of the two series-connected battery modules with which it is associated to a common value by diverting current taken from across the terminals of the module which provides the greater voltage across its terminals, end until said greater voltage has been reduced to the value present across the terminals of the module providing the smaller voltage.

5 Claims, 2 Drawing Sheets

MODULAR REGULATOR CIRCUIT, FOR A MODULAR ELECTRICAL STORAGE CELL BATTERY, HAVING A NUMBER OF MODULES DEPENDENT ON THE NUMBER OF MODULES OF THE BATTERY

The invention relates to a regulator circuit for a battery of electrical storage cells, and in particular for a battery in which voltage is a function of state if charge, as applies in particular to batteries based on a couple of the lithium-ion type.

BACKGROUND OF THE INVENTION

It is known that certain batteries, and in particular, those of the type mentioned above, are poor at withstanding deep discharges and overcharging, so it is necessary to take special precautions to prevent such events during use, especially when the batteries comprise cells that are connected in series.

For various known reasons, the individual cells making up a given battery do not all operate under exactly the same conditions, and they do not all age identically, so it is often not sufficient to monitor the operation of a battery solely on the basis of electrical measurements performed in operation from the end terminals thereof.

In particular, with batteries that include cells connected in series, the slightest differences that may exist initially between the cells tend to increase with operation to the detriment of the poorer cells such that their loss of performance gives rise more or less quickly to loss of performance in the other cells.

It is therefore known, both during charging and during discharging, to associate measurements performed cell by cell with the measurements already performed across the end terminals of a battery that is in operation in order to be able to take action on the battery as a function of the way in which each of its cells taken individually is, in fact, performing, and also as a function of the way in which the overall assembly constituted by all of said cells is performing as a whole. It is also known that the same operations can be performed on modules that are made up identically, each comprising the same number of cells selected from within a battery that includes a large number of cells.

OBJECT AND SUMMARY OF THE INVENTION

The invention thus seeks to provide a regulator circuit for a battery of electrical storage cells, in particular, a battery whose voltage is a function of its state of charge, the battery itself being made up of a plurality of "n" identical modules connected in series.

According to a characteristic of the invention, the circuit comprises "n–1" regulation modules each respectively associated with two series-connected modules of the battery, each regulation module including regulator means for bringing the voltage across the terminals of each of the two series-connected battery modules with which it is associated to a common value by diverting current taken from the terminals of that one of the modules which provides the greater voltage until said greater voltage is reduced to the same value as the voltage present across the terminals of the module that has the smaller voltage.

BRIEF DESCRIPTION OF THE DRAWINGS

The invention, its characteristics, and its advantages are described in greater detail below with reference to the accompanying drawings, in which.

MORE DETAILED DESCRIPTION

Figure 1:
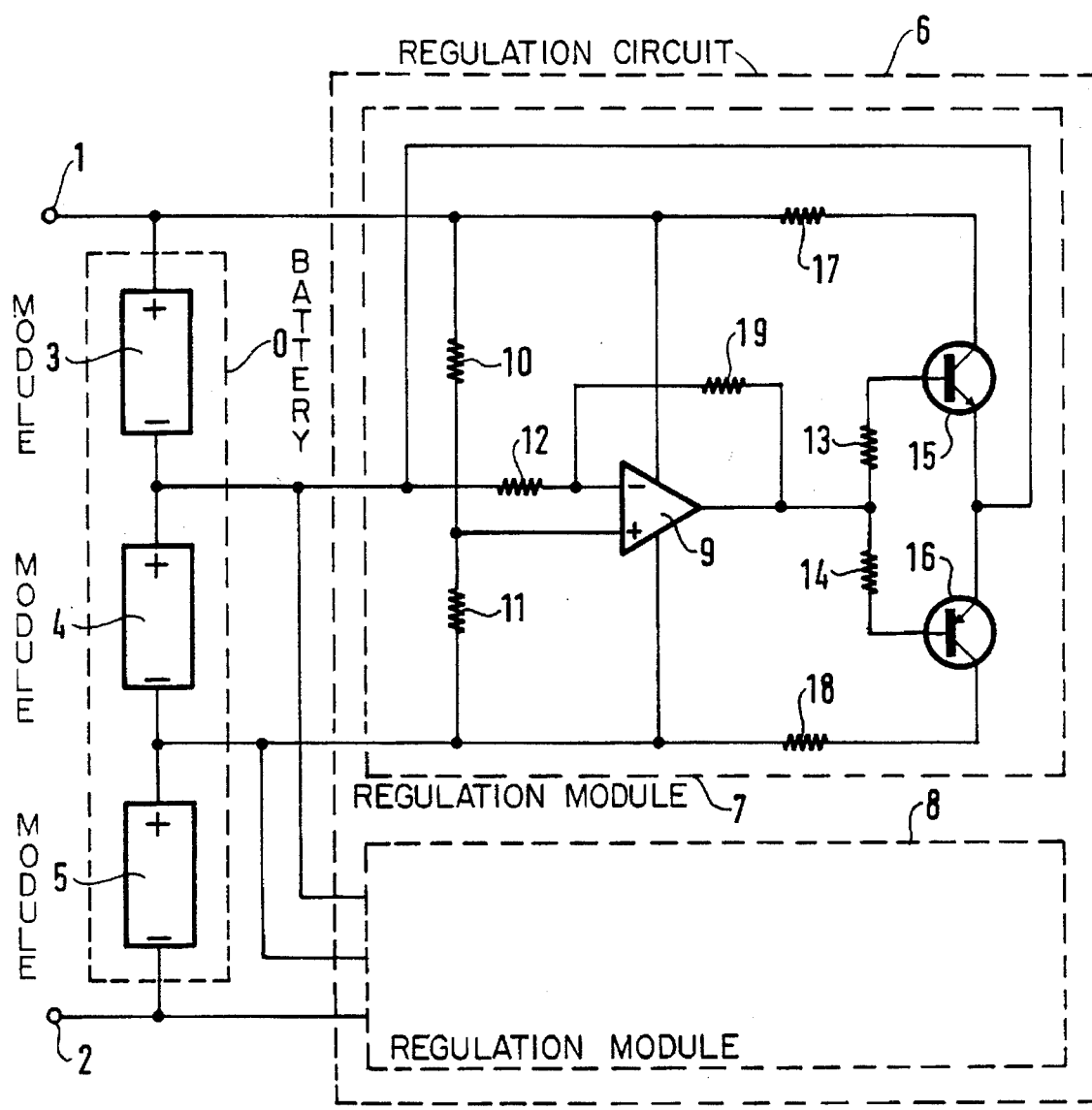
FIG. 1 is a circuit diagram of a battery fitted with a regulator circuit of the invention.

The battery 0 of electric storage cells as shown in FIG. 1 is assumed to comprise an integer number "n" of modules which are connected in series between two terminals 1 and 2, one of which is positive and the other negative, which terminals are suitable for connection to a load and/or to a charger (not shown). Each module is preferably constituted by a single cell, even though it is possible to group together a plurality of cells in series and/or in parallel within a single module. The "n" modules (each having one cell in this case) of the battery 0 constitute three modules in the example described, which modules are referenced 3, 4, and 5, and they are associated with a regulation circuit 6 of the invention. The regulation circuit is of modular structure and comprises "n–1" identical regulation modules, each associated with a pair of interconnected battery modules, i.e. two identical regulation modules 7 and 8, one of which is associated with the modules 3 and 4 and the other of which is associated with the modules 4 and 5 in the present example.

Each regulation module in this case serves to balance the state of charge between the two battery modules with which it is associated by continuously balancing their voltages. To this end, a comparator circuit takes account of the two voltages present across the terminals of the two series-connected battery modules with which each regulation module is associated, e.g. the voltages across the terminals of the modules 3 and 4, for regulation module 7. This comparator circuit is implemented, for example, by means of an operational amplifier given reference 9 in regulator module 7, and by a divider bridge of equal-resistance resistors 10 and 11 whose midpoint is connected to a non-inverting input of the amplifier 9. The amplifier also has an inverting input connected to the point in common to the two above-mentioned battery modules 3 and 4 via a resistor 12.

The output of the amplifier 9 is connected to a common point between two resistors 13 and 14 with the resistor 13 being connected to the base of an NPN type transistor 15 and the resistor 14 being connected to the base of a PNP type transistor 16. These two transistors are connected in series via their respective emitter-collector connections to the end terminals of the assembly constituted by the two series-connected battery modules 3 and 4, and they have their collectors respectively connected via resistors 17 or 18 to the positive terminal 1 of the battery and to the end module 3 (for the transistor 15) and to the negative terminal of the module 4 (for the transistor 16).

In addition, the point common to the emitters of the transistors 15 and 16 is connected to the common point of the modules 3 and 4, these two points thus being at the same potential.

Any voltage unbalance between the modules 3 and 4 thus gives rise to discharge from that one of the modules whose terminals provide the higher voltage, e.g. causing the module 4 to discharge via the resistor 18 and the transistor 16 assuming that the voltage across the terminals of the module 4 is found to be greater than that present across the terminals of the module 3 by the comparator circuit organized around the amplifier 9.

In order to avoid any parasitic discharge of one or other of the modules 3 and 4 as a result of a measurement error concerning the voltage difference between the modules due, for example, to the offset voltage in the comparator circuit and/or to inaccuracy in the resistances of the resistors 10 and 11 of the divider, a voltage threshold is provided for the comparator which is therefore organized as an amplifier. Gain is therefore set for the amplifier 9 by means of the resistor 12 and the negative feedback resistor 19 connected between the output of the amplifier 9 and its inverting input. Neither of the transistors 15 and 16 can be caused to conduct unless there exists a voltage difference between the modules 3 and 4 which is greater than a value that is equal to the emitter-base voltage of that one of the transistors which would then be switched on, divided by the gain of the amplifier 9.

In this case, the regulation module 8 is identical to regulation module 7 and it acts with respect to the modules 4 and 5 to perform the same functions as those performed by the regulation module 7 with respect to the modules 3 and 4. Consequently, the voltages and the charges on all of the modules 3, 4, and 5 tend to become uniform on the basis of references set by those of the modules that present the lowest voltage and therefore the lowest states of charge. If so desired, the regulator device 6 can be kept in operation continuously both during charging and during discharging, it being understood that it is also capable of being put into operation merely on a temporary basis by adding conventional appropriate switching means that are not shown herein.

The regulation circuit 6 described above for a battery having three modules in series can be adapted to regulate a battery having some larger number of modules in series merely adding additional regulation modules, with the presence of any additional battery module in series requiring the addition of an additional regulation module to the circuit which therefore comprises "n–1" regulation modules for "n" battery modules.

The regulation circuit as described above may nevertheless be found to be insufficient if the charging current that might be delivered to a module exceeds the current that can be diverted for balancing purposes by one of the transistors 15 or 16 via the associated resistor 17 or 18. Unless special precautions are taken, the regulation module associated with a battery module is incapable of preventing said battery module being overcharged once it has been fully charged. Only a portion of the charging current delivered to the module can be diverted, so some of that current continues to flow through the module and serves to overcharge it pointlessly. A solution to this problem is described below with reference to FIG. 2.

A portion of the above circuit is to be found in FIG. 2 where there can again be seen a battery having "n" modules which are connected in series between two terminals 1' and 2', one of the terminals being positive and the other negative, which terminals are designed for connection to a load, and each module preferably corresponding to a single battery cell, as mentioned above.

Figure 2:
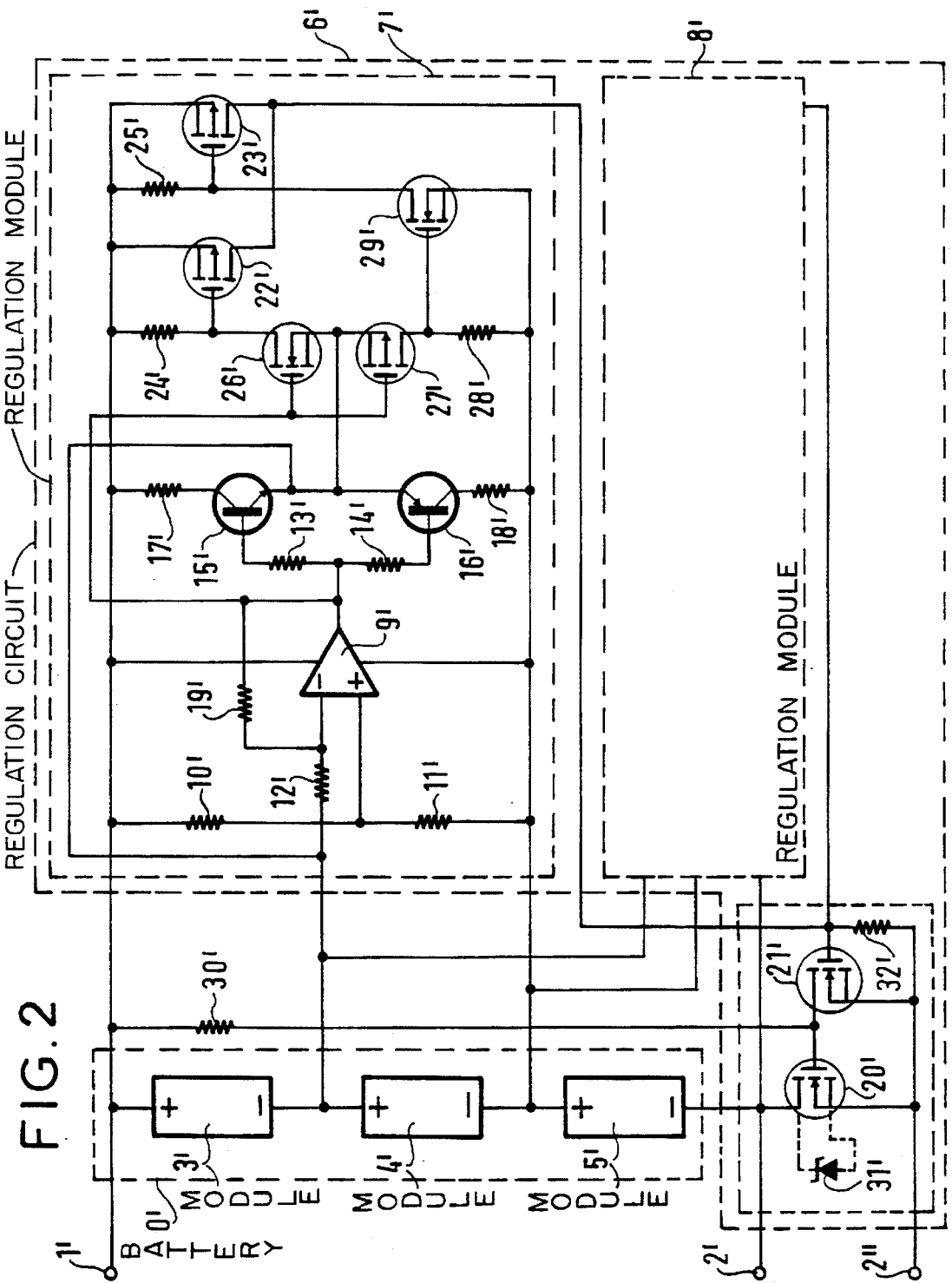
FIG. 2 is a circuit diagram of a battery fitted with a variant regulator circuit of the invention.

As before, the number "n" of battery modules shown in FIG. 2 is limited to three modules in series respectively referenced 3', 4', and 5', which modules are associated with a regulation circuit 6'. The circuit therefore comprises "n–1" identical regulation modules which are represented herein by two regulation modules referenced 7' and 8'. The circuit also includes an additional circuit portion that is common to all of the modules and that is provided for connection between the negative terminal 2' of the battery and a negative terminal 2" that is provided for connection to a charger that is also connected to the positive terminal 1'.

The regulation module 7' corresponds to a regulation module 7 or 8 as described above that has additional components added thereto, and in particular it comprises: an operational amplifier 9', resistors 10' to 14', 17', 18', and 19', and two transistors 15', and 16' which are organized in the same manner and perform the same functions as the corresponding component parts 9 to 19 of the regulation module 6.

While the battery is being charged via the terminals 1' and 2" and by means of a charger (not shown), and when the maximum current Im that can be diverted by one or other of the balancing resistors 17' and 18' has been achieved, then the voltage at the output from the amplifier 9' becomes either highly positive or else highly negative depending on which battery module is having its charging current diverted for balancing purposes.

According to the invention, a charging current limiting transistor 20' is provided (in this case a P channel depletion MOS type transistor) which is connected to the negative terminal 2' of the battery via its drain, to the negative terminal 2" for connection to the charger via its source, and to the positive terminal 1' of the battery via its grid and a bias resistor 30'. The transistor 20' makes it possible to reduce the battery charging current progressively all the way down to switching it off, end it does this whenever the maximum current value Im is reached in one of the balancing resistors 17' or 18' of the regulation module 7', or in one of the corresponding resistors (not shown) in one of the other regulation modules of the circuit 6'. To this end, the grid of the current limiting transistor 20' is connected to the drain of a transistor 21' which is constituted, in this case, by a transistor of the same type which is associated therewith in an amplifier configuration in which both transistors have their sources connected to the terminal 2", and in which the grid of transistor 21' is capable of being controlled by each of the regulation modules of the circuit 6', as mentioned below.

In each regulation module, and in particular in the module 7', the grid of the transistor 21' is connected, in this case, to the respective drains of two P channel MOS type regulation transistors 22' and 23'. Each of these transistors is respectively active for a different one of the battery modules. Their respective sources are connected to the positive terminal 1' of the battery and their respective grids are biased via resistors 24' and 25' relative to said positive terminal 1'. Two complementary transistors 26' and 27' (in this case both MOS type transistors, the first having an N channel and the second a P channel) serve to control respective ones of the complementary regulation transistors 22' and 23'. These transistors 26' and 27' are connected in series between the positive terminal 1' to which the module 3' is connected and the negative terminal of the module 4'. To this end, the drain of transistor 26' is connected to the terminal 1' via resistor 24', with the source of the same transistor being connected to the source of the transistor 27' and to the common point between the emitters of the transistors 15' and 16'. The drain of transistor 27' is connected to the negative terminal of the module 4' via a resistor 28'. The output of amplifier 9 acts simultaneously on the respective grids of 26' and 27' and controls one or other of them as a function of the polarity of the signal present on the output of said amplifier 9, and thus it controls that one of the modules 3' and 4' that requires a reduction in charging current.

The transistor 26' has its drain connected to the grid of regulation transistor 22', thereby switching it on whenever it is itself switched on.

The "intermediate" transistor 27' has its drain connected to the grid of a regulation transistor 29' of the same type as the transistor 26', and to the resistor 28', as mentioned above. The source of the transistor 29' is connected to the negative terminal of the module 4' and its drain is connected to the grid of transistor 23' which it switches on whenever it is itself on, whenever the transistor 27' is switched on by the output signal from the amplifier 9.

Whenever the current diverted by one or other of the transistors 15' and 16' reaches the maximum value set by the balancing resistors 17' end 18', and consequently whenever the output signal from the amplifier 9 is either highly positive or highly negative, then one or other of the transistors 26' and 27' is switched on. When the transistor 26' is switched on it causes transistor 22' to be switched on, whereas when the transistor 27' is switched on it causes the transistor 29' to be switched on and consequently also switches on the transistor 23'. When they conduct, each of the transistors 22' and 23' serves to control conduction of the transistor 21' and consequently to control the action of the current limiting transistor 20' until the charging current is switched off, should that be necessary.

If the current limiting transistor 20' is switched off by the transistor 21', that has no effect on the process of battery discharge, should such discharge take place via the terminal 2", end insofar as it is capable of occurring via an internal diode 31' associated with the transistor 20' and symbolized by dashed line connections.

As before, the voltage end consequently the charge in each of the "n" modules of a battery associated with a regulation circuit such as 6' therefore tends to become uniform under the conditions described above and this applies both during charging and during discharging, should that be desired.

The regulator circuits 6 and 6' serve to ensure continuous balancing between the various modules of the battery both during charging and during discharging or rest, and they can be used on a temporary basis merely by adding suitable switching means for switching them in and out of service.

I claim:

1. A regulator circuit for a battery of electrical storage cells, and in particular for a battery whose voltage is a function of its state of charge and which is constituted by "n" identical modules ("n" being an integer) connected in series between end terminals of the battery, the circuit comprising "n–1" regulation modules each respectively associated with two series-connected modules of the battery, each regulation module including regulator means for bringing the voltage across the terminals of each of the two series-connected battery modules with which it is associated to a common value by diverting current taken from the terminals of that one of the modules which provides the greater voltage until said greater voltage is reduced to the same value as the voltage present across the terminals of the module that has the smaller voltage.

2. A regulator circuit according to claim 1, also comprising charging current limitation means for limiting the charging current delivered to the battery, said means operating above a determined maximum current threshold for the current diverted by a regulation module from one or other of the two series-connected modules of the battery with which the regulation module is associated, each regulation module having means for determining when said threshold has been crossed, and means for applying corresponding control to the charging current limitation means.

3. A regulator circuit according to claim 1, comprising regulator means incorporated in each regulation module, comprising a circuit built around an operational amplifier and resistors for preparing the voltages present across the terminals of the two series-connected battery modules with which the regulation module is associated, and switching means controlled in mutual phase opposition depending on the polarity of the voltage present at the output from a comparator circuit so as to connect a balancing resistor across the terminals of that one of the two series-connected battery modules having the larger voltage across its terminals.

4. A regulator circuit according to claim 1, including charging current limitation means constituted by a circuit comprising at least one current-limiting transistor which is coupled between a terminal of the battery that is provided for connection to a load and a charger terminal of the battery provided for connection to a charger, said charger terminal being of the same polarity as said terminal, wherein the circuit is controlled via two intermediate transistors that are controlled in phase opposition, said intermediate transistors being oppositely switched on depending on the polarity of a voltage present at an output of an operational amplifier of a comparator circuit when said voltage provides current beyond a maximum current threshold for current flowing through one of balancing resistors, and wherein each of the intermediate transistors is associated with at least one additional transistor enabling said each intermediate transistor to act separately on the current-limiting transistor.

5. A regulator circuit according to claim 1, providing continuous balancing between modules of a battery during at least one of charging, discharging and rest.

* * * * *